US011521098B2

(12) United States Patent
Jang et al.

(10) Patent No.: US 11,521,098 B2
(45) Date of Patent: Dec. 6, 2022

(54) MODELING CONTROVERSY WITHIN POPULATIONS

(71) Applicant: University of Massachusetts, Boston, MA (US)

(72) Inventors: Myungha Jang, Amherst, MA (US); Shiri Dori-Hacohen, Granby, MA (US); James Allan, Amherst, MA (US)

(73) Assignee: University of Massachusetts, Boston, MA (US)

( * ) Notice: Subject to any disclaimer, the term of this patent is extended or adjusted under 35 U.S.C. 154(b) by 917 days.

(21) Appl. No.: 16/367,734

(22) Filed: Mar. 28, 2019

(65) Prior Publication Data

US 2019/0303784 A1  Oct. 3, 2019

Related U.S. Application Data

(60) Provisional application No. 62/649,423, filed on Mar. 28, 2018.

(51) Int. Cl.
  *G06F 17/18*  (2006.01)
  *G06N 7/00*  (2006.01)
  (Continued)

(52) U.S. Cl.
  CPC .............. *G06N 7/00* (2013.01); *G06F 17/18* (2013.01); *G06Q 30/0201* (2013.01); *H04L 51/52* (2022.05)

(58) Field of Classification Search
  CPC ..... H04L 63/1416; H04L 67/22; H04L 51/52; G06F 17/18; G06F 16/285; G06N 7/00; G06Q 30/0201
  See application file for complete search history.

(56) References Cited

U.S. PATENT DOCUMENTS

| 7,702,508 B2 | 4/2010 | Bennett |
| 9,336,192 B1 | 5/2016 | Barba et al. |

(Continued)

FOREIGN PATENT DOCUMENTS

| IL | 265851 | 10/2021 |
| WO | 2018068002 A1 | 4/2018 |
| WO | WO2018/068002 | * 4/2018 |

OTHER PUBLICATIONS

L. Amendola et al., "The evolving perception of controversial movies," Palgrave Communications 1 (2015), pp. 1-9.

(Continued)

*Primary Examiner* — Jungwon Chang
(74) *Attorney, Agent, or Firm* — Hamilton, Brook, Smith & Reynolds, P.C.

(57) ABSTRACT

Disclosed herein are systems and methods for modeling controversy as a combination of at least contention and importance with respect to a given population. An example system for modeling controversy within a population includes an interface, memory, and processor. The interface is configured to obtain information regarding stances of individuals in the population on a topic. The processor is configured to determine, and store in the memory, a representation of contention on the topic among individuals of the population. The representation of contention is based on the stances of individuals in the population. The processor is further configured to determine, and store in the memory, a representation of importance of the topic within the population. The processor is configured to create, and store in the memory, a model of controversy for the topic based on the representations of contention and importance.

20 Claims, 9 Drawing Sheets

(51) Int. Cl.
  *H04L 51/52* (2022.01)
  *G06Q 30/02* (2012.01)

(56) References Cited

U.S. PATENT DOCUMENTS

| | | | |
|---|---|---|---|
| 10,949,620 | B2 | 3/2021 | Dori-Hacohen et al. |
| 2006/0184354 | A1 | 8/2006 | Huang et al. |
| 2008/0052078 | A1 | 2/2008 | Bennett |
| 2009/0228478 | A1* | 9/2009 | Steichen ............... G06Q 99/00 707/999.005 |
| 2012/0136985 | A1* | 5/2012 | Popescu ................ G06Q 50/01 709/224 |
| 2012/0158626 | A1 | 6/2012 | Zhu et al. |
| 2013/0185361 | A1 | 7/2013 | Balasubramanian et al. |
| 2014/0164994 | A1* | 6/2014 | Myslinski ........... G06F 3/04817 715/808 |
| 2016/0078472 | A1* | 3/2016 | Asur .................. G06Q 30/0245 705/14.44 |
| 2017/0060997 | A1 | 3/2017 | Lee et al. |
| 2017/0228655 | A1* | 8/2017 | Alarie .................... G06Q 10/10 |
| 2019/0034417 | A1* | 1/2019 | On ........................ G06F 16/285 |
| 2019/0294677 | A1 | 9/2019 | Dori-Hacohen et al. |

OTHER PUBLICATIONS

R. Awadallah et al., "Harmony and Dissonance : Organizing the People's Voices on Political Controversies," New York (Feb. 2012), 523-532.
E. Borra et al., "Societal Controversies in Wikipedia Articles," Proceedings of the 33rd Annual ACM Conference on Human Factors in Computing Systems—CHI 2015 (2015), pp. 193-196.
U. Brandes et al., 2009. "Network analysis of collaboration structure in Wikipedia," WWW 2009 Madrid!, pp. 731-740.
L. Cedroni. 2010. "Voting Advice Applications in Europe: A Comparison," Voting Advice Applications in Europe:—e State of Art (2010), 247-258.
Z. Chen and J. Berger. 2013. "When, Why, and How Controversy Causes Conversation," Journal of Consumer Research 40, 3 (2013), 43 pages.
M. Coletto et al., 2016. "Polarized user and topic tracking in twitter," In SIGIR. ACM, 945-948.
P.A. Cramer. 2011. "Controversy as News Discourse," Springer Netherlands.
Marcelo Dascal, "Epistemology, Controversies, and Pragmatics," Isegona 12, 8-43 (1995).
S. Dori-Hacohen and J. Allan. 2013. "Detecting controversy on the web," In CIKM '13, Oct. 27-Nov. 1, 2013, San Fransisco, California.
F.H.V. Eemeren and B. Garssen. 2008. "Controversy and confrontation: Relating controversy analysis with argumentation theory," vol. 6. John Benjamins Publishing.
K. Garimella et al., "Quantifying controversy in social media," WSDM (2016).
D. J. Helfand. 2016. "A Survival Guide to the Misinformation Age: Scientific Habits of Mind," Columbia University Press.
C. Holderness. "What Colors Are This Dress?" (2015). https://www.buzzfeed.com/catesish/help-am-i-going-insane -its-definitely-blue.
M. Jang and J. Allan. 2016. "Improving Automated Controversy Detection on the Web," In SIGIR.
M. Jang et al., Oct. 2016. "Probabilistic Approaches to Controversy Detection," In CIKM.

A. Kittur et al., "He says, she says: conflict and coordination in Wikipedia," In CHI 2207 Proceedings, Apr. 28-May 3, 2007, San Jose, California.
M. Klenner et al., "Verb Polarity Frames: a New Resource and its Application in Target-specific Polarity Classification," Proceedings of KONVENS, 2014, pp. 106-115.
A.I. Leshner. 2015. "Bridging the opinion gap," Science 347, 6221 (2015), 459.
Pew Research Center. 2015. "An Elaboration of AAAS Scientists' Views," Technical Report.
Pew Research Center. 2015. "Public and Scientists' Views on Science and Society," Technical Report.
H. S. Rad and D. Barbosa. 2012. "Identifying controversial articles in Wikipedia: A comparative study," In WikiSym '12. ACM.
R. Sumi et al., 2011. "Edit Wars in Wikipedia," In 2011 IEEE Third Int'l Conference on Social Computing.
P. Barrotta et al., Controversies and Subjectivity, pp. 201-234, (2005).
The Electoral Comission. 2016. EU referendum results. (2016).
B. Timmermans et al., 2017. "ControCurator: Understanding Controversy Using Collective Intelligence," Collective Intelligence (2017).
A. M Wilson and G. E Likens. 2015. "Content volatility of scientific topics in Wikipedia: A cautionary tale," PLoS One 10, 8 (2015), 10-14.
T. Yasseri et al., 2014. "The most controversial topics in Wikipedia: A multilingual and geographical analysis," In Global Wikipedia: International and cross-cultural issues in collaboration. 178.
T. Yasseri et al., 2012. "Dynamics of conflicts in Wikipedia," PloS one 7, 6 (Jun. 2012), e38869.
Y. Choi et al., "Identifying controversial issues and their sub-topics in news articles," In Intelligence and Security Informatics. Springer, 2010.
D. Corney et al., "What do a million news articles look like?" In Workshop on Recent Trends in News IR, ECIR'16.
S. Das et al., "Manipulation among the arbiters of collective intelligence: how wikipedia administrators mold public opinion,". In CIKM'13.
Y. Mejova et al., "Controversy and sentiment in online news," arXiv preprint arXiv:1409.8152, 2014.
E. Pariser, "The Filter Bubble: What the Internet Is Hiding from You," 2011.
Roitman et al., "On the Retrieval of Wikipedia Articles Containing Claims on Controversial Topics," WWW '16 Companion Proceedings of the 25th International Conference Companion on World Wide Web, pp. 991-996.
T. Rose et al., "The Reuters Corpus," vol. 1. In LREC 2002.
International Search Report and Written Opinion for PCT/US2017/055637, US International Search Authority, dated Dec. 15, 2017.
European Extended Search Report for Application No. 17859289.5, entitled "Methods for Automated Controversy Detection of Content," dated May 13, 2020.
S. Dori-Hacohen et al., Jul. 7, 2016; "Controversy Detection in Wikipedia Using Collective Classification"; SIGIR.
S. Dori-Hacohen and J. Allan. Automated controversy detection on the web. In ECIR'15.
"What is Controversy? Modeling Contention as a Dimension of Controversy," http://ciir.cs.umass.edu/irdemo/contention, downloaded from Internet on Oct. 17, 2019.
Jang et al., "Modeling Controversy within Populations," ICTIR'17, Oct. 1-4, 2017, Amsterdam, The Netherlands, 8 pages.

\* cited by examiner

MODELING CONTROVERSY WITHIN POPULATIONS

RELATED APPLICATION(S)

This application claims the benefit of U.S. Provisional Application No. 62/649,423, filed on Mar. 28, 2018. The entire teachings of the above application are incorporated herein by reference.

GOVERNMENT SUPPORT

This invention was made with government support under award number IIS-121728 from National Science Foundation. The government has certain rights in the invention.

BACKGROUND

Websites and online social networks, such as Twitter, Facebook, and discussion boards, have become some of the most popular places where controversial arguments are held. Accordingly, technological tools have also become important in shaping these discussions by curating and filtering the content seen by each user. From a computational perspective, however, controversy has not been understood well enough. Algorithms based on an incomplete understanding of controversy are bound to fail in unexpected ways, which can replicate or even exacerbate the sources of human bias.

SUMMARY

Disclosed herein are systems and methods that can address these issues by modeling controversy as a combination of at least "contention" and "importance" with respect to a given population.

One example embodiment is a system for modeling controversy within a population. The example system includes an interface, memory, and processor. The interface is configured to obtain information regarding stances of individuals in the population on a topic. The processor is configured to determine, and store in the memory, a representation of contention on the topic among individuals of the population, the representation of contention being based on the stances of individuals in the population. The processor is further configured to determine, and store in the memory, a representation of importance of the topic within the population. The processor is configured to create, and store in the memory, a model of controversy for the topic based on the representations of contention and importance.

Another example embodiment is a method of modeling controversy within a population. The example method includes determining contention on a topic among individuals of the population, determining importance of the topic within the population, and creating a model of controversy for the topic based on the contention and importance.

Another example embodiment is a machine-readable storage medium having stored thereon a computer program for modeling controversy within a population. The computer program includes a routine of set instructions for causing the machine to determine contention on a topic among individuals of the population, determine importance of the topic within the population, and create a model of controversy for the topic based on the contention and importance.

The topic or the stances can be expressed in any of: textual information, numeric data, survey responses, blog post, article comment, webpage, social media post, online forum post, any combination thereof, or any other online or offline data sources. The disclosed systems and methods can predict whether the topic is controversial based on the model of controversy, and can determine a controversy score for the topic based on the model of controversy. In some embodiments, determining contention on the topic can include determining a proportion of individuals in the population that are in disagreement regarding the topic. In some embodiments, determining contention can include determining stances that individuals in the population have on the topic, and can include determining a probability that two given individuals have conflicting stances on the topic. In some embodiments, it can be determined whether pairs of stances are mutually exclusive, thus reducing complexity of the determination of controversy. In some embodiments, determining importance of the topic can include determining a probability that the topic is importance to a given individual in the population.

Another example embodiment is a system for determining contention within a population. The example system includes an interface, memory, and processor. The interface is configured to obtain information regarding stances of individuals in the population on a topic. The processor is configured to determine, and store in the memory, representations of stances of individuals in the population with regard to a topic. The processor is further configured to, for pairs of stances, determine, and store in the memory, a representation of a measure of conflict between a first stance and a second stance. The processor is further configured to determine, and store in the memory, a representation of a probability that a first individual and a second individual hold conflicting stances on the topic.

Another example embodiment is a method of determining contention within a population. The example method includes determining stances of individuals in the population with regard to a topic. For pairs of stances, a measure of conflict can be determined between a first stance and a second stance. The example method further includes determining a probability that a first individual and a second individual hold conflicting stances on the topic.

Another example embodiment is a machine-readable storage medium having stored thereon a computer program for determining contention within a population. The computer program includes a routine of set instructions for causing the machine to determine stances of individuals in the population with regard to a topic. For pairs of stances, a measure of conflict can be determined between a first stance and a second stance. The computer program further includes instructions for causing the machine to determine a probability that a first individual and a second individual hold conflicting stances on the topic.

Determining a stance of an individual can include determining whether the individual holds a stance on the topic. For a plurality of stances, individuals holding a particular stance can be grouped into a stance group. In such embodiments, determining a probability that a first individual and a second individual hold conflicting stances on the topic can include determining a probability that a first individual and a second individual belong to conflicting stance groups. For a given stance group, individuals holding a mutually exclusive stance with respect to the given stance group can be grouped into an opposing stance group. In such embodiments, determining a probability that a first individual and a second individual hold conflicting stances on the topic can include determining a probability that a first individual belongs to a given stance group and that a second individual belongs to an opposing stance group with respect to the given stance group.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Disclosed herein is a model for controversy with respect to population. According to the concepts disclosed herein, controversy is a multi-dimensional quantity that should only be understood in a given population. Disclosed is a model with two minimal dimensions: contention and importance. Contention mathematically quantifies the notion of "the proportion of people disagreeing on this topic" in a population-dependent fashion. On the other hand, importance measures how many people are affected by the given topic in the population. We validate our model on a wide variety of datasets from both offline and online sources, ranging from large informal online polls and Twitter data to statistically calibrated phone surveys and Wikipedia. Our experimental results show that our model has an explanatory power as well as a predictive power for the observed phenomenon.

Figure 1:
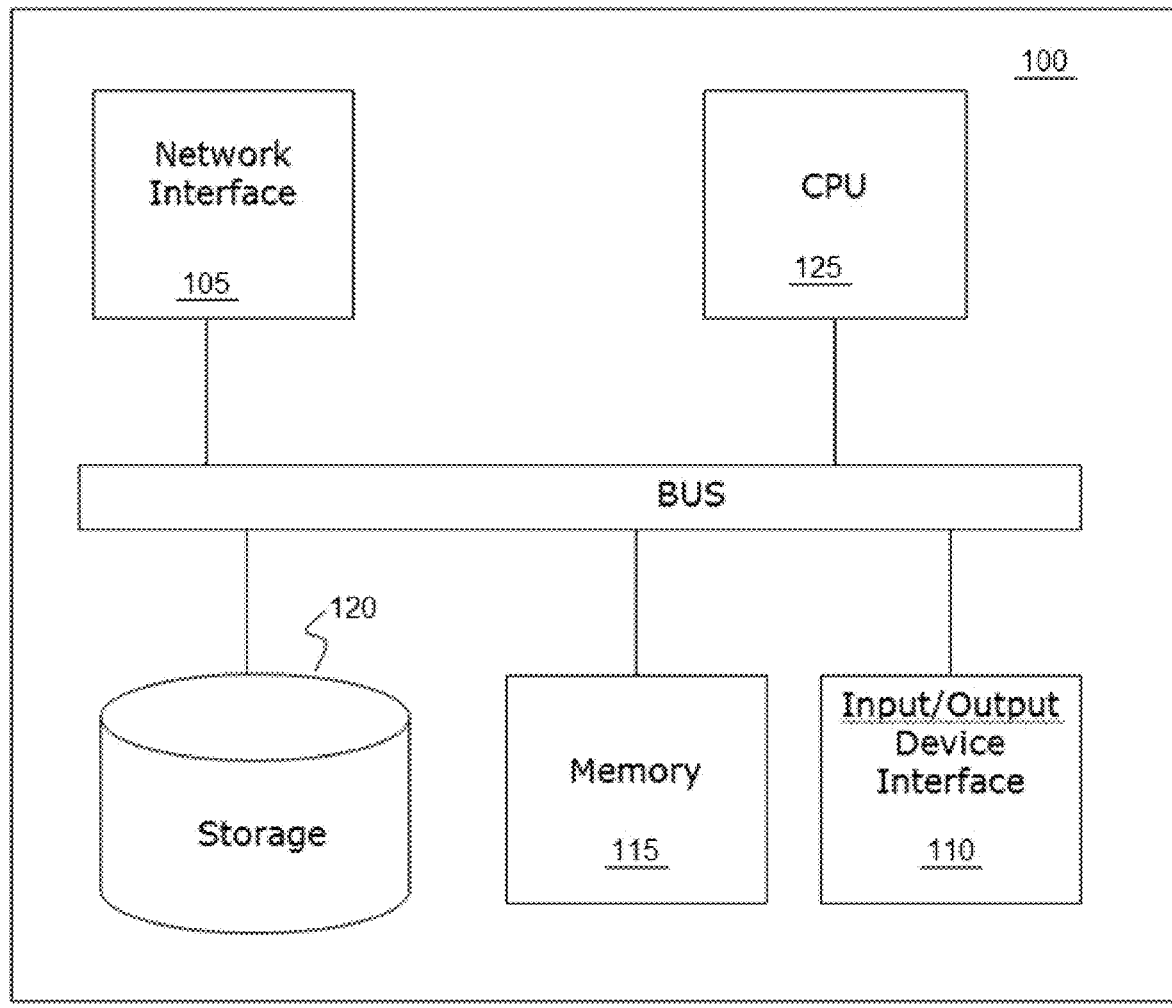
FIG. 1 is a block diagram illustrating a system for modeling controversy within a population, according to an example embodiment.

FIG. 1 is a block diagram illustrating a system 100 for modeling controversy within a population, according to an example embodiment. The example system 100 includes an interface (e.g., network interface 105 or IO device interface 110), memory (e.g., memory 115 or storage 120), and processor 125. The interface 105, 110 is configured to obtain information regarding stances of individuals in the population on a topic. The processor 125 is configured to determine, and store in the memory 115, 120, a representation of contention on the topic among individuals of the population, the representation of contention being based on the stances of individuals in the population. The processor 125 is further configured to determine, and store in the memory 115, 120, a representation of importance of the topic within the population. The processor 125 is configured to create, and store in the memory 115, 120, a model of controversy for the topic based on the representations of contention and importance.

In addition, or in the alternative, the processor 125 can be configured to determine, and store in the memory 115, 120, representations of stances of individuals in the population with regard to a topic. The processor 125 can be further configured to, for pairs of stances, determine, and store in the memory 115, 120, a representation of a measure of conflict between a first stance and a second stance. The processor 125 can be further configured to determine, and store in the memory 115, 120, a representation of a probability that a first individual and a second individual hold conflicting stances on the topic.

Figure 2A:
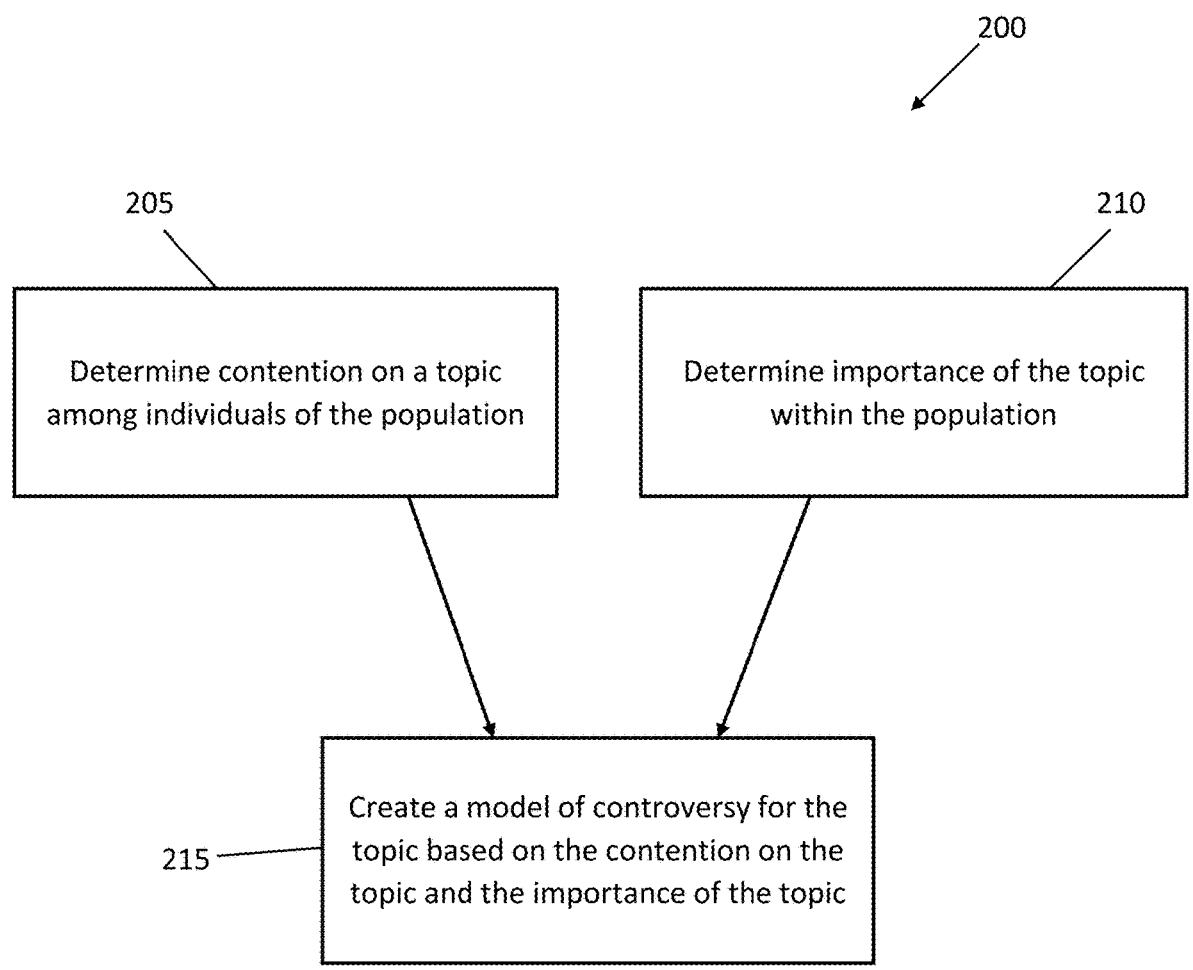
FIG. 2A is a flow diagram illustrating a method for modeling controversy within a population, according to an example embodiment.

FIG. 2A is a flow diagram illustrating a method 200 for modeling controversy within a population, according to an example embodiment. The example method 200 includes determining 205 contention on a topic among individuals of the population, determining 210 importance of the topic within the population, and creating 215 a model of controversy for the topic based on the contention and importance.

Figure 2B:
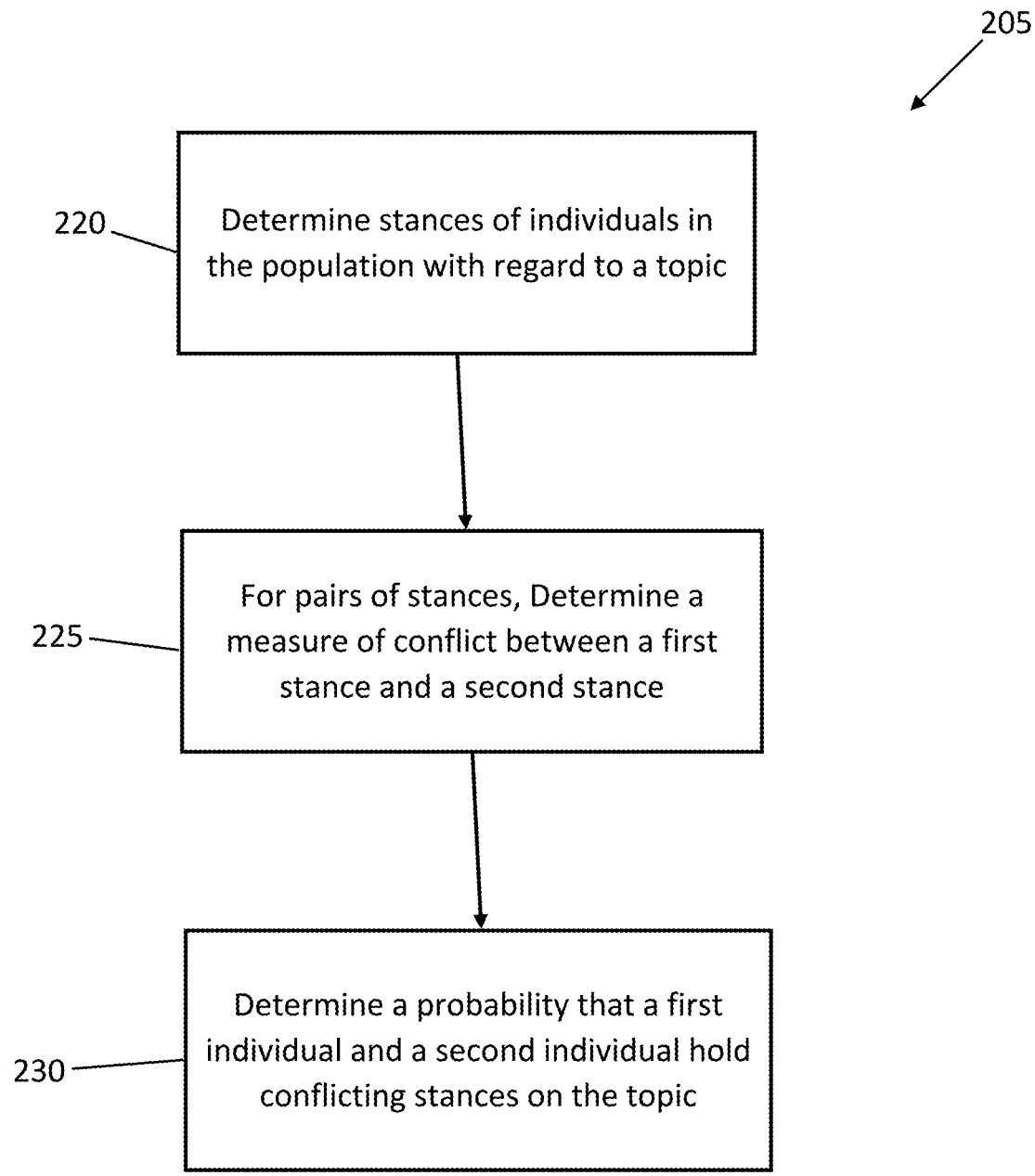
FIG. 2B is a flow diagram illustrating a method for determining contention within a population, according to an example embodiment.

FIG. 2B is a flow diagram illustrating a method for determining contention within a population, according to an example embodiment. The example method 205 includes determining 220 stances of individuals in the population with regard to a topic. For pairs of stances, a measure of conflict can be determined 225 between a first stance and a second stance. The example method further includes determining 230 a probability that a first individual and a second individual hold conflicting stances on the topic.

The disclosed systems and methods can be used, for example, to detect misinformation in news articles, predict effects on stock prices, inform crisis management and public relations, and for defense and policing purposes, such as detecting or predicting civil unrest. The disclosed systems and methods can be used in commercial applications, such as, for example, to predict how a proposed advertisement will be received by a target audience. In one example embodiment, an Application Programming Interface (API) can be provided. A user can submit a given text on a topic to the API and obtain information regarding the level of controversy involving the topic. The disclosed systems and methods can also be used to provide actionable insight (e.g., alternative data in the finance world) that can be used, for example, in commercial applications.

The following describes an example embodiment of the disclosed controversy model.

1. Introduction

Past work on controversy cuts across traditional disciplinary lines—including a wide variety of computational tasks along with the social sciences and the humanities—and has made significant strides in analyzing and detecting controversy. Nevertheless, there are serious gaps in current theoretical and practical understanding of how to define controversy, how it manifests, and how it evolves. For example, polling organizations naturally select topics of broad interest and segment their results based on certain populations defined by demographics such as race and gender. These notions are surprisingly absent from algorithmic analyses of controversy. Instead, controversy has only been defined as an absolute, single value for an amorphous global population.

Meanwhile, there has been a growing disparity between scientific understanding and public opinion on certain controversial topics, such as climate change, evolution, and vaccination, with many scientists fighting these trends by arguing that "there is no controversy" (referring to scientific controversy). Still, non-scientific claims and arguments have continued to proliferate, raising exposure to the supposedly non-existent controversies. As researchers studying controversies online, how can we reconcile the oft-repeated argument from the scientific community that "there is no controversy" with the practical appearance of wildly diverse opinions on many topics? In other words, is a topic like climate change controversial?

We address these issues using a model that defines controversy as a combination of at least "contention" and "importance" with respect to a given population. The model therefore captures the idea that not all controversies are of equal interest. It also suggests that the right question to be asked is not "is climate change controversial?" but instead "is climate change controversial to a particular group?"

Our framework departs from prior work on controversy in several important ways. First, we define controversy in terms of not only its topic but also a given population. Second, our model accounts for participants in the population who hold no stance on a specific topic and also allows for any number of stances rather than just a strict dichotomy. Third, our model allows that some items may be less controversial because they are contentious but not important (and vice versa). These elements give our model explanatory power that can be used to understand a large variety of observed phenomena, ranging from international conflict and community-specific controversies to high-stakes public controversies on well-understood phenomena such as climate change, evolution, and vaccination.

In order to ground our model, we examine a diverse collection of datasets from both online and offline sources. First, we examine several real-world polling datasets, including a poll that focuses on opinions about scientific topics, such as climate change and evolution, measured among the general US population and the scientific community. Additionally, we look at Twitter coverage for three prominent controversies: the 2016 US Elections, the UK European Union membership referendum, commonly known as Brexit, and "The Dress," a photo that went viral when people disagreed on its colors. We cross-reference contention from Twitter with other data sources: a popular online poll for "The Dress," real voter data for Brexit, and the US Elections. Finally, we apply our model to Wikipedia and show that it can predict whether a Wikipedia article is controversial.

2. Related Work

Most recent work on controversy has measured controversy as either a binary state or a single quantity, both of which are to be measured or estimated directly. With a few exceptions, earlier work did not model controversy formally. Even when it did, the meaning of controversy was not modeled, but instead assumed to be a known quantity in the world. Most prior work in computer science does not define controversy and treats it as a global quantity. Past research shows that achieving inter-annotator agreement on the "controversy" label is challenging.

Meanwhile, most of the work on controversy in the social sciences and the humanities is qualitative by nature and often focuses on one or two examples of controversy. Otherwise, it works toward a more qualitative analysis of the overall patterns across controversies. Chen and Berger, while discussing whether controversy increases buzz and whether that is good for business, propose that "controversial issues tend to involve opposing viewpoints that are strongly held." However, these definitions leave a gap when people disagree on opinions that are strongly held on less important topics such as the color of a dress, the orientation of toilet paper. There may be "opposing viewpoints" in these topics, but there is no real controversy. We depart from past research by modeling controversy as a multidimensional quantity within population. Similarly, Timmermans et al. also identified five aspects of controversy in news articles: time persistence, emotion, multitude of actors, polarity, and openness.

3. Modeling Population-Based Controversy

Controversy is a complicated social phenomenon. Since it is difficult to formally and systematically define what controversy is, there has been little effort to formulate a model that quantifies the level of controversy for a given topic.

As an example, consider two controversies: "The Dress" and the Brexit referendum. First, "The Dress" refers to a photo that went viral over social media starting on Feb. 26, 2015 after people could not agree on its colors. The photo was posted to tumblr.com and made popular by a Buzzfeed article that asked "What color is this dress?" in a poll with two options: black and blue or gold and white. To date, over 37 million people viewed the article. Second, the Brexit referendum, officially known as the UK European Union membership referendum, was a referendum that took place on Jun. 23, 2016 in which 51.9% of UK voters voted to leave the European Union. The referendum had immediate political and financial ramifications, including the worst one-day drop in the global stock market in history.

When observed by populations interested in each controversy, "The Dress" and Brexit were both extremely contentious. Nearly any group of people sampled from these populations was strongly divided in their opinion. However, it is clear that placing "The Dress" and Brexit in the same bucket is problematic. Brexit affects the fate of entire nations, with far-reaching consequences on diplomatic relationships and the world economy. The other, a photo of the dress, caused a surprising divided reaction in color perception, went viral around the world, and was subsequently forgotten by nearly everyone. In other words, it had little impact on the world.

Therefore, we propose a new model in which controversy is composed of at least two orthogonal dimensions, which together play a role in determining how controversial a topic is for a given population, one of which is contention. However, this dimension alone cannot adequately explain less important controversies like "The Dress." An additional orthogonal metric is needed in order to distinguish between contention and controversy. Therefore, we hypothesize the existence of a notion of importance as a novel dimension of controversy. While more dimensions can be investigated, we hypothesize that these are the core features of controversy.

Figure 3:
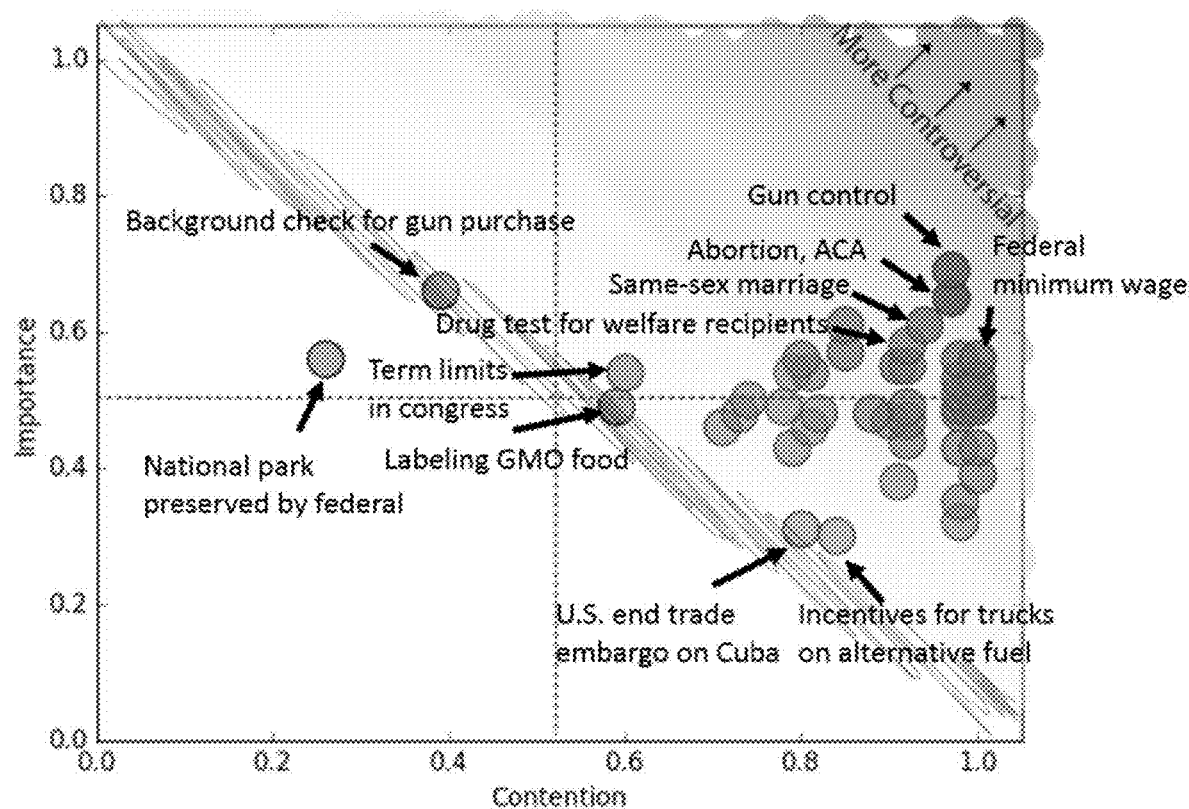
FIG. 3 is a graph illustrating topics plotted in a two-dimensional controversy plot of contention and importance. Contention scores are computed by a definition of contention presented herein, and importance was given by users in the dataset. Sample topics are given in each quadrant of {low, high} importance and contention.

This framework is illustrated schematically in FIG. 3, overlaying actual results including importance reported in the iSideWith dataset (see Table 2). The first dimension is contention, which we define as the proportion of people who are in disagreement. The other dimension is importance, which we loosely define as the level of impact of that issue to the world, and which was reported by users of iSideWith. In FIG. 3, we hypothesize controversy to be a two-dimensional concept. An issue is more controversial when it has high contention and high importance (i.e., towards the right upper corner of FIG. 3). FIG. 3 shows a quadrant where an issue can have a {high, low} contention with a {high, low} importance. Issues, such as gun control, abortion, and the Affordable Care Act, have high contention and high importance. Therefore, they are more controversial. Issues, such as whether the government should provide incentives for trucks to run on alternative fuels, is highly contentious but less important according to users.

Finally, we model the probability of controversy with a given topic T and a given population $\Omega$. Let Cont a binary random variable, which denotes the presence of controversy. Similarly, let C and I be binary random variables, which denotes the presence of contention and importance of topic T.

We model P Cont $\theta$, where $\theta=\{T, \Omega\}$ as the probability that topic T is controversial within the population $\Omega$. Our model hypothesizes that the probability of controversy given T and $\Omega$ is the joint probability of two dimensions: contention (C) and importance (I), to be more rigorously defined below.

$$P(Cont|\theta)=P(C,I|\theta)$$

Here, P (C, I|$\theta$) can be further decomposed as following:

$$P(C,I|\theta) = \frac{P(C,I,\theta)}{P(\theta)} = \frac{P(I|C,\theta)\cdot P(C|\theta)\cdot P(\theta)}{P(\theta)} = P(I|C,\theta)\cdot P(C|\theta)$$

To compute P (I C, $\theta$), the correlation between contention and importance of topic to a population has to be identified. While it is difficult to estimate the exact correlation in the real world, we assume that contention and importance are independent of each other, consisting of orthogonal dimensions of controversy. We therefore let P (I|C, $\theta$)=P (I|$\theta$).

$$P(Cont|\theta)=P(C|\theta)\cdot P(I|\theta)$$

We now describe the modeling of P (C|$\theta$) and P (I|$\theta$) and how to estimate them from the real data. Refer to Table 1 for the summary of the notations that are used in the model.

TABLE 1

Notation summary

| | |
|---|---|
| $\Omega$ | a population |
| P (Cont |$\theta$ ) | the probability that topic T is controversial in a given population $\Omega$ |
| P (C |$\theta$ ) | the probability that T is contentious in $\Omega$ |
| P (I |$\theta$ ) | the probability that T is important in $\Omega$ |
| C | a binary random variable for contention |
| c | a binary value to set C to be "contentious" |
| nc | a binary value to set C to be "non-contentious" |
| s | a stance with regard to topic T |
| holds (p, s, T) | a person p holds stance s with regard to topic T |
| affected (T, p) | a binary function that returns whether or not a person p is affected by topic T |
| S | k stances with regard to topic T |
| $s_0$ | a lack of stance |
| $G_i$ | a group of people who hold stance $s_i$ |
| $O_i$ | an opposing group in the population that hold a stance that conflicts with $s_i$ |

3.1 Modeling Contention from Population

We define a measure we call contention, which quantifies the proportion of people in disagreement within a population. We begin with a general formulation of contention and then describe a special case in which stances are assumed to be mutually exclusive.

Let $\Omega=\{p_1 \ldots p_n\}$ be a population of n people. Let T be a topic of interest to at least one person in population $\Omega$. We define C to be a binary variable to denote whether a given topic is contentious. Let us also define two binary values c and nc for C, each of which respectively means contentious and non-contentious. For example, P (C=c|$\Omega$, T) denotes the probability that T is contentious in $\Omega$, which we will simply denote it as P (c|$\Omega$, T). Therefore, P (c|$\Omega$, T)+P (nc|$\Omega$, T)=1 satisfies.

Let s denote a stance with regard to the topic T, and let the relationship holds (p, s, T) denote that person p holds stance s with regard to topic T. Let $\hat{S}=\{s_1, s_2, \ldots s_k\}$ be the set of k stances with regard to topic T in the population $\Omega$. We allow people to hold no stance at all with regard to the topic (either because they are not aware of the topic or because they are aware of it but do not take a stance on it). We use $s_0$ to represent this lack of stance. In that case, let $$holds(p,s0,T)\Longleftrightarrow \nexists s_i \in \hat{S} \text{ s.t. } holds(p,s_i,T),$$

Let $S=\{s_0\} \cup \hat{S}$ be the set of k+1 stances with regard to topic T in the population $\Omega$. Therefore, $\forall p \in \Omega, \exists s \in S$ s.t. holds(p,s,T). Now let us define a measure conflict to denote how much two stances are exclusive. P (conflict|si, sj)=1 indicates that $s_i$ and $s_j$ are in a complete conflict, meaning mutually-exclusive. In other words, P (conflict|si, sj)=0 indicates that two stances completely agree with each other. This probability measures the severity of conflict between two stances.

Not all stances are necessarily mutually exclusive or in a complete agreement. A stance of "abortion should be legalized only in certain circumstances" is not mutually exclusive to any of "pro-choice" or "pro-life" stances. In this case, the probability is somewhere in between 0 and 1. Note that a person can hold multiple stances simultaneously as long as none of the two stances are mutually exclusive. Also, not any stance can be jointly held with $s_0$. By definition, P (conflict|si, sj)=0 and P (conflict|si, sj)=0 satisfy.

Let a stance group in the population be groups of people that hold the same stance: for i $\in\{0 \ldots k\}$, let $G_i=\{p \in \Omega|holds(p,s_i,T)\}$. By construction, $\Omega=U_i \; G_i$. We let P (conflict|Gi, Gj) be a probability that two groups of Gi and Gj are in a conflict, similarly as it was defined for two stances. As a reminder, the goal is to quantify the proportion of people who disagree. Intuitively, we would like to have that quantity grow when the groups in disagreement are larger. In other words, if we randomly select two people, how likely are they to hold conflicting stances?

We model contention directly to reflect this question. Let P (c|$\Omega$, T) be the probability that if we randomly select two people in $\Omega$, they will conflict on topic T. This is equal to:

$$P(c|\Omega,T)=P(p1,p2 \text{ selected randomly from } \Omega, \exists si, sj \in S,$$

$$s.t. \; holds(p1,si,T)\wedge holds(p2,sj,T))\cdot P(conflict|si,sj)$$

Alternatively:

$$P(c|\Omega,T)=P(p1,p2 \text{ selected randomly from } \Omega, \exists si, sj \in S,$$

$$s.t. \; p1 \in Gi \wedge p2 \in Gj)\cdot P(conflict|Gi,Gj)).$$

Finally, we extend this definition to any sub-population of $\Omega$. Let $\omega \subseteq \Omega, \omega \neq \emptyset$ be any non-empty sub-group of the population. Let $g_i=G_i \cap \omega$. Thus, by construction, $g_i \subseteq G_i$ and $\omega=U_i \; g_i$. The same model applies respectively to the sub-population. In other words, for any $\omega \subseteq \Omega$, $$P(c|\omega,T)=P(p_1,p_2 \text{ selected randomly from } \omega$$

$$\wedge \exists i \; s.t. \; p_1 \in g_i \wedge p_2 \in g_i)\cdot P(conflict|Gi,Gj).$$

Mutually exclusive stances. Most controversial topics have at least two exclusive mutually stances to bisect the community. In this section, we focus on the case of mutually exclusive stances and describe the model that can be defined. The model described here can be easily generalized by adjusting the value of P (conflict|si, sj).

Intuitively, a group is in the most contentious state when it is equally divided among the two stances. On the other hand, if a group is unequally divided among each stance, the stance of the smaller subgroup would be considered the minority, contributing to a smaller contention score. Our model captures this insight below.

Recall that stance group G is defined as the population of people who hold a stance si on T. We also define an opposing group in the population be a group of people that hold a stance that conflicts with $s_i$. For $i \in \{0 \ldots k\}$, let $O_i = \{p \in \Omega | \exists j \text{ s.t. holds}(p, s_j, T) \wedge \text{conflict}(s_i, s_j)\}$. The model with mutually exclusive stances can alternatively be expressed as:

$$P(c|\Omega,T) = P(p1, p2 \text{ selected randomly from } \Omega, \exists si, sj \in S,$$

$$\text{s.t. } p1 \in Gi \wedge p2 \in Oi).$$

Note that we are selecting with replacement, and it is possible for $p_1 = p_2$. Strictly speaking, this model allows a person to hold two conflicting stances at once and thus be in both $G_i$ and $O_i$, as in the case of intrapersonal conflict. This definition, while exhaustive to all possible combinations of stances, is very hard to estimate. We now consider a special case of this model with two additional constraints. Let every person have only one stance on a topic:

$$\exists p \in \Omega, s_i, s_j \in S \text{ s.t. } i \neq j \wedge$$

$$\text{holds}(p, s_i, T) \wedge \text{holds}(p, s_j, T).$$

And, let every explicit stance conflict with every other explicit stance:

$$P(\text{conflicts}|(si,sj)) = 1 \Longleftrightarrow (i \neq j \wedge i \neq 0 \wedge j \neq 0)$$

This implies that $G_i \cap G_j = \emptyset$. Crucially, we set a lack of stance not to be in conflict with any explicit stance. Thus, $O_i = \Omega \setminus G_i \setminus G_0$.

For simplicity, we estimate the probability of selecting $p_1$ and $p_2$ as selection with replacement. Note that $|\Omega| = \Sigma_{i \in \{0 \ldots k\}} |G_i|$ and the probability of choosing any particular pair is $$\frac{1}{|\Omega|^2}.$$

The denominator, $|\Omega|^2$, expands into the following expression:

$$|\Omega|^2 = (\Sigma_i |G_i|)^2 = \Sigma_{i \in \{0 \ldots k\}} |G_i||G_i|^2 + \Sigma_{i \in \{1 \ldots k\}} (2|G_0||G_i|)$$

$$+ \Sigma_{i \in \{2 \ldots k\}} \Sigma_{j \in \{1 \ldots i-1\}} (2|G_i||G_j|)$$

Depending on whether the pair of people selected hold conflicting stances, they contribute to the numerator in $P(c|\Omega, T)$ or $P(nc|\Omega, T)$, respectively. Therefore, $$P(c|\Omega, T) = \frac{\sum_{i \in \{2 \ldots k\}} \sum_{j \in \{1 \ldots i-1\}} (2|G_i||G_j|)}{|\Omega|^2}$$

-continued and $$P(nc|\Omega, T) = 1 - P(c|\Omega, T).$$

As before, we can trivially extend this definition to any non-empty sub-population $\omega \subseteq \Omega$ using $g_i = G_i \cap \omega$.

Trivially, $P(C|\omega, T)$ is maximal when when $$|g_0| = 0 \text{ and } |g_1| = \ldots = |g_k| = \frac{|\omega|}{k},$$

and its value is $$\frac{k-1}{k}.$$

This is subtly different from entropy due to the existence of $s_0$, as entropy would be maximal when $$|g_0| = |g_1| = \ldots = |g_k| = \frac{|\omega|}{k-1}.$$

Since the values of contention are $$\left[0, \frac{k-1}{k}\right]$$

rather than [0,1], we normalize by the maximal contention (divide the contention score by $$\frac{k-1}{k})$$

and take the non-contention score as 1 minus the new score. This normalization brings both contention and non-contention to a full range of [0,1] each, with a contention score of 1 signifying the highest possible contention, regardless of the total number of stances.

3.2 Modeling Importance within Population

We now define a measure called "importance." We loosely define importance as the level of impact that the issue brings to the world within a given population. In terms of importance of a topic T to population $\Omega$, we interpret this as the number of people who think this topic is important to them. In other words, how many people are affected by T?

Let p be a person from some population and affected(T, p) be a binary function that returns whether p is affected by T. We let the probability that T is important to members of $\Omega$ be P (I|$\Omega$, T). This is equivalent to the probability that T is important to the person p drawn from $\Omega$.

$$P(I|\Omega, T) = P(p \text{ selected randomly from } \Omega \wedge \text{affected}(p, T))$$

Alternatively, we define $\Omega T$ be the sub-population of $\Omega$ with those who are affected by $T \cdot P(I|\Omega, T)$ can be computed by directly estimating $|\Omega T|$.

$$P(I \mid \Omega, T) = \frac{|\Omega_T|}{|\Omega|}$$

Introducing importance into the controversy model allows us to penalize the controversy score for the contentious yet less important topics. For example, a sub-population $\omega D$ that is affected by "The Dress" case is unarguably smaller than a sub-population $\omega B$ that is affected by the Brexit Referendum. It follows that if we set $\Omega$ to the general population, we can now directly compare the importance of two topics in a general sense.

The affected(p) relationship is only defined conceptually here because its interpretation will vary with each dataset. In our experiments, we describe how to directly estimate the size of $|\Omega_T|$ from various datasets.

4. Model Validation

We apply our model to the various data sources. To apply our model, we instantiate the model to algorithms that has been derived considering the characteristics of each dataset. We examine three different data sources: polling data, Twitter, and Wikipedia. We show that our model has both explanatory power and predictive power.

4.1 Contention in Polling

In the Pew and Gallup datasets, we used the topline survey results as reported by each organization. For a given poll topic T, $\omega$ is the set of respondents, si are the set of response possibilities, and "no answer" represents $s_0$. This determines gi and thus allows us to calculate $P(c|\omega, T)$ as above.

4.1.1 U.S. Scientists vs. General Population. Using one dataset acquired from Pew Research Center, a non-partisan fact tank in the US, we are able to examine attitudes towards a number of issues among two populations: US adults and US scientists. The opinions for US adults was gathered among a representative sample of 2,002 adults nationwide, while the opinions for scientists were gathered among a representative sample from the US membership of the American Association for the Advancement of Science (AAAS) (Table 2).

Figure 4:
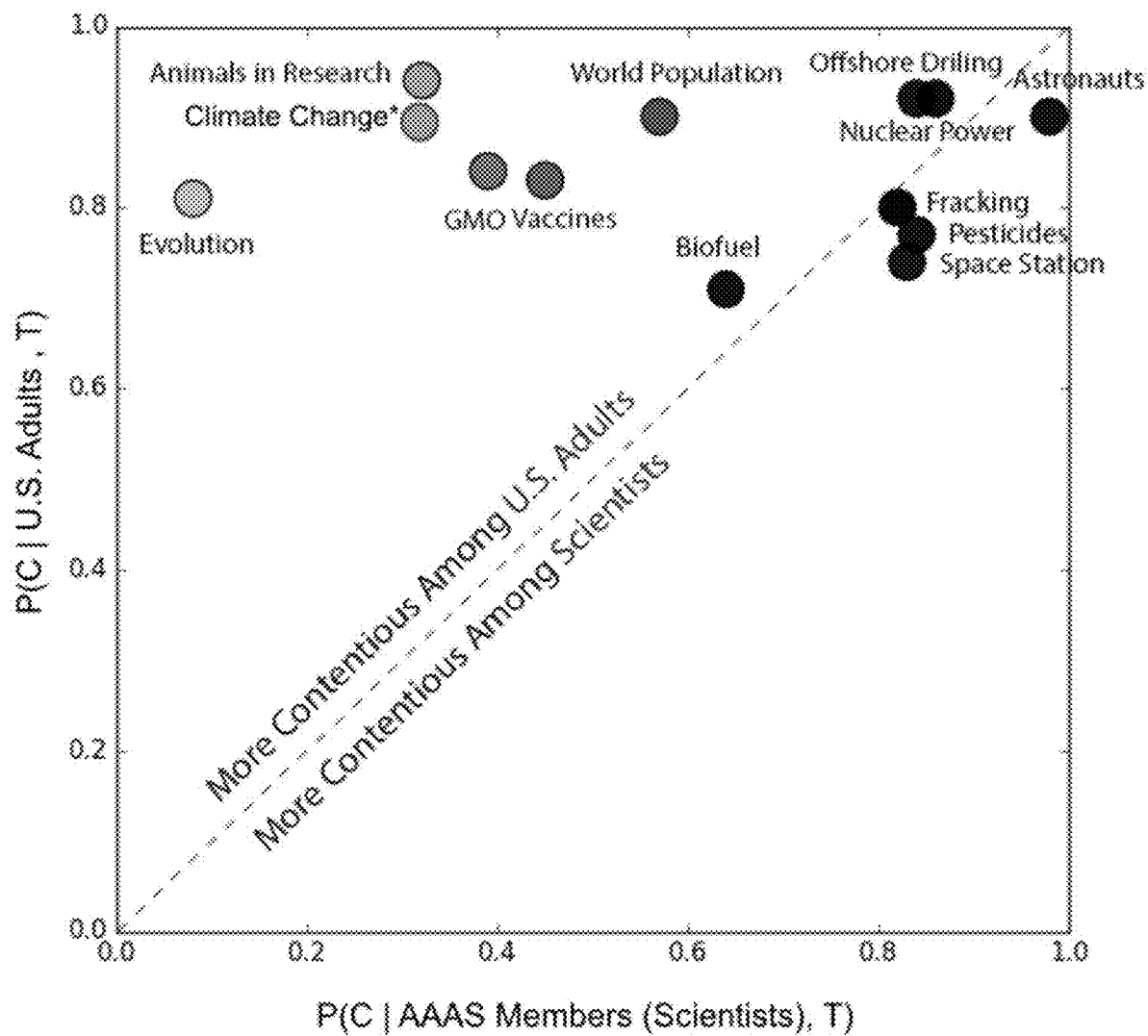
FIG. 4 is a graph illustrating contention in the scientific community vs. the general population for several controversial topics. The x=y line represents equal contention among both populations, with dots shaded according to their distance from the line.
Figures 5A, 5B:
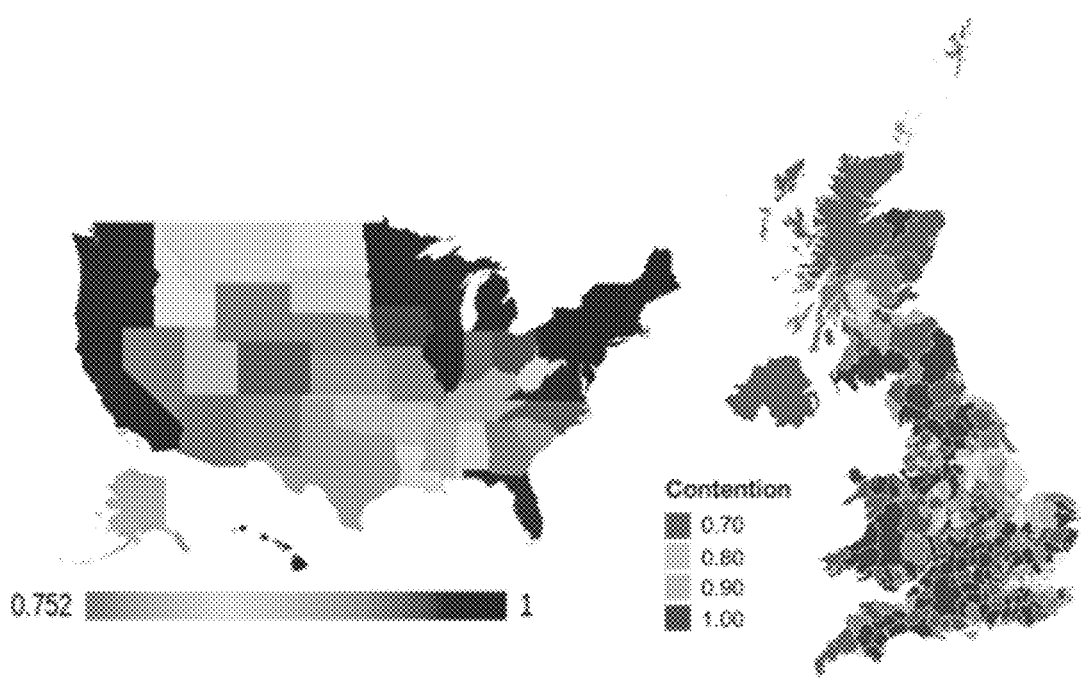
FIG. 5A illustrates per-state contention for the question "Do you support increased gun control?"
FIG. 5B illustrates contention by voting district in the United Kingdom.

As seen in FIG. 4, for some topics, such as offshore drilling, hydraulic fracturing (fracking), and biofuel, contention was similar between US adults and scientists. On other topics, such as evolution, climate change, and the use of animals in research, contention varied widely depending on the population: the scientific community had low contention for these topics whereas they were highly contentious among US adults. This result precisely matches earlier work's intuitive notion of politically, but not scientifically, controversial topics. The graph clearly demonstrates the notion that "there is no controversy" (among scientists) alongside the controversy in general population, with evolution as the most extreme case presented in this dataset (98% of AAAS members surveyed said that "humans and other living things have evolved over time", whereas 31% of the US adults said that they have "existed in their present form since beginning of time").

4.1.2 Per-state distribution of Contention in the U.S. We obtained a dataset from the iSideWith.com website, a non-partisan Voting Advice Application which offers users the chance to report their opinions on a wide variety of controversial topics and outputs the information of which political candidate they most closely align with. We received the 2014 iSideWith dataset by request from the website owners, which includes nation-wide and per-state opinions over 52 topics. Each topic is posed as a question with two main options for answers, usually a simple "yes" or "no". Additionally, the dataset includes the average importance of the issue (both nation-wide and per-state) rated by the users.

Using the iSideWith dataset, we measure contention nationwide and per-state on each of the 52 topics available. The two least contentious questions nation-wide were "Should National Parks continue to be preserved and protected by the federal government?" (P (c US, t)=0.26), and "Should every person purchasing a gun be required to pass a criminal and public safety background check?" (P (c|U S, t)=0.39). Several topics had over 0.99 contention nation-wide, such as "Should the US formally declare war on ISIS?" and "Would you support increasing taxes on the rich in order to reduce interest rates for student loans?" among others. We present the per-state contention for one such topic in FIGS. 6A-6C, which shows how contention varies geographically. An interactive demo with per-state contention on all 52 topics is available at http://ciir.cs.umass.edu/irdemo/contention.

TABLE 2

Datasets containing explicit stances

| Dataset | Type | # Issues | Populations(s) | Years | # People |
|---|---|---|---|---|---|
| Pew Adults | Statistically Calibrated Phone Survey | 13 | US adults | 2014 | 2.0K |
| Pew AAAS | Statistically Calibrated Online Survey | 13 | US scientists | 2014 | 3.7K |
| iSideWith | Informal Online Polling | 52 | US people | 2014 | varies (M) |
| Dress Buzzfeed | Informal Online Polling | 1 | Online readers | 2015-2016 | 3.5M |

4.2 Controversy in Twitter

Social media allows people to quickly respond to a topic, compared to surveys or other types of media. We turn to Twitter and observe how controversy changes over time on three well-known contentious topics: "The Dress", the Brexit Referendum, and 2016 US Presidential Election.

To apply our model to Twitter, we create an instance of our model that automatically identifies a population for whom the topic is relevant, and identify stances of people on the topic to measure contention. Note that we need to identify the population of interest first to estimate |g0|, the group that has an interest in the topic but that does not take any stance.

4.2.1 Measuring Contention in a Twitter Population. We instantiate our model to compute the level of controversy for a given topic on Twitter. Instead of considering the entire Twitter population, we first automatically identify the sub-population interested in the topic T since the vast majority of people hold no stance even for the most controversial topics. Measuring contention within the relevant sub-population gives a more meaningful result on Twitter. We start with a single hashtag "seeding" the topic, and the algorithm consists of three steps to identify the relevant sub-population and compute contention: (1) query hashtag expansion, (2) finding a population of interest, and (3) estimating the size of stance groups.

Qyery hashtag expansion: We start with the hashtag h of interest. Our goal here is to expand h to a set of k hashtags that are topically related to h, namely $H_T$.

To do that, let $\Gamma$ be a collection of tweets (e.g., the tweets collected for some day) and let $\Gamma(h)$ be the subset of those tweets that contain the hashtag h. For any hashtag h'≠h that occurs in $\Gamma(h)$, we calculate a TFIDF score as follows: TF is the number of times that h' occurs in $\Gamma(h)$ and IDF is an inverse fraction of the frequency of h, in $\Gamma$.

Note we aim to the topic T as the top k relevant hashtags $H_T$ ranked by TFIDF in $\Gamma$. However, one concern of that approach is that the hashtags in $H_T$ is likely to vary greatly depending on which of them is chosen as a seed. To mitigate that risk, we create Hq for each hashtag $q \in H_T$. We then select the k hashtags that appear most often across all sets Hq. We call the resultant list T, and create a dataset $\Gamma(T)$, which is a collection of tweets that contain any hashtag in T.

Identifying the population of interests to T: From $\Gamma(T)$, we extract every user id who tweeted, is mentioned, or is retweeted. We consider this set of users as the population that shows interests in T We call this sub-population $\omega T$ as the people who are affected by T. $\omega T$ is the population where the importance of T is maximized to 1 because by construction, it is the group of people who showed interests in T by explicitly discussing it on Twitter. Table 3 contains the size of $\Gamma(T)$ and the identified population that shows interests.

TABLE 3

Twitter dataset with implicit stances

| Topis | # Tweets | # Users | Dates |
|---|---|---|---|
| The Dress | 359K | 361K | Feb. 26-Mar. 3, 2015 |
| Brexit Referendum | 14.8M | 12.4M | May. 1-Jul. 24, 2016 |
| US Elections | 9.3M | 6.2M | Sep. 20-Nov. 30, 2016 |
| Total | 24.4M | 18.9M | |

Stance detection in the sub-population Automatic stance detection is an open problem, so we use a simple and straight-forward manual hashtag-based stance detection heuristic. We manually identified hashtags that explicitly indicate a stance. The full list of hashtags used is available at http://ciir.cs.umass.edu/irdemo/contention.

This high-precision, low-recall process will omit some tweets that do not use precisely the hashtags selected, but those that are selected are likely to be on the expected stance. We leave analysis of the remaining tweets and other hashtags for future work in stance extraction.

Using the stance hashtags we created, we compute the size of the two stance groups per topic by counting the number of user ids in the tweets that contain any hashtag from each stance. As an estimate of G0 (the group with no stance) on each topic, we used all other tweets collected via the Twitter Garden Hose API that day. Specifically, |G0|=count of all users collected −|G1|−|G2|.

Figure 6A:
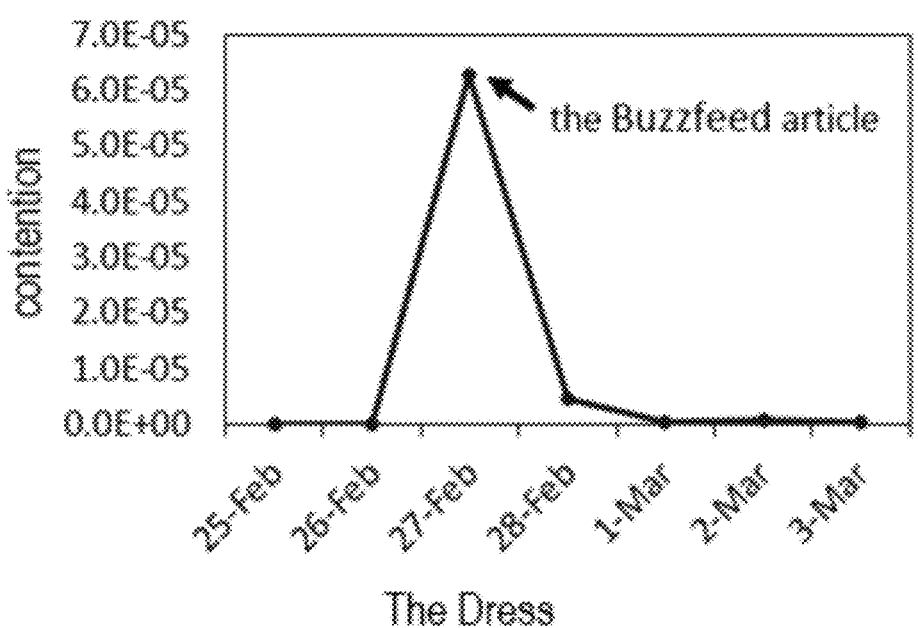
FIGS. 6A-6C are graphs illustrating controversy among daily tweets by date for The Dress, Brexit, and 2016 US Elections. Notable peaks are annotated with associated events around that time.
Figure 6B:
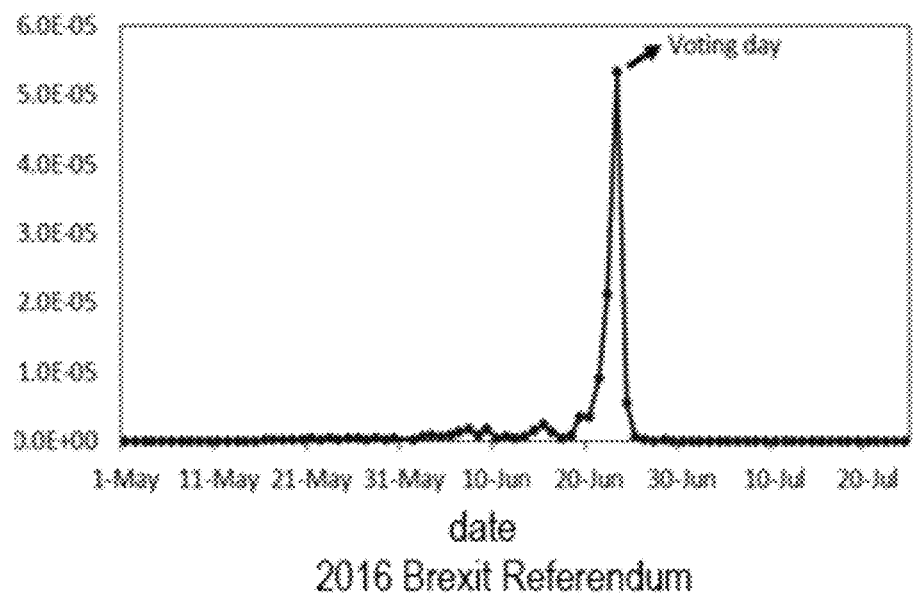
Figure 6C:
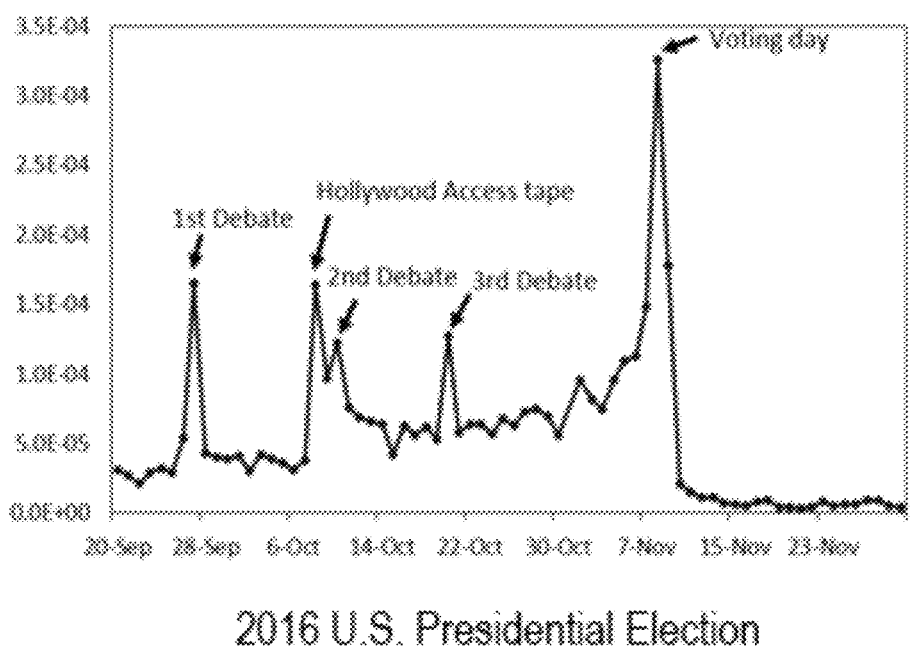

4.2.2 Controversy Trends on Twitter. We compute the final level of controversy by multiplying the contention computed on the identified population by the importance of that topic within the entire population that tweeted the same day. FIGS. 6A-6C show the controversy among all daily tweets by date for "The Dress," Brexit, and the 2016 US election. In all three plots, it shows marked peaks of contention around notable event times. For example, in the case of the US election, small peaks appear on the days of the presidential debates, and upon release of the extremely controversial Hollywood Access tape, with a much larger peak on election day. This showcases the strength of our model and its ability to track the difference between contention among the group for which the topic is relevant.

We compare $P(c|G_1 \cup G_2, T)$ from Twitter across a series of dates, along with the same probability calculated from external sources: the Buzzfeed poll on "The Dress" ($P(c|G_1 \cup G_2, T)=0.88$), voting results on Brexit ($P(c|G_1 \cup G_2, T)=1.00$), and the popular vote in the U.S. Elections measured for the two main candidates ($P(c|G_1 \cup G_2, T)=0.89$). Additionally, FIG. 6B shows the voting contention for each Unitary District of the UK (local Ireland results were not available), demonstrating the geographical variance of contention. Gibraltar, an extreme outlier both geographically and contention-wise, is omitted from the map ($P(c|Gibraltar, Brexit)=0.16$). The extremely low contention makes sense: Gibraltar is geographically located inside Europe, and 95.9% of its voters voted "remain."

4.3 Controversy in Wikipedia

We now apply our model to the context of Wikipedia by measuring controversy among Wikipedia editor population.

4.3.1 Contention from Wikipedia Editor-population. Rather than estimating stances, our challenge now becomes to provide an estimate for the conflicts function directly between pairs of editors. Several past researchers have noted the centrality of Wikipedia reverts to the study of controversies. Yasseri et al. in particular established reverts as a central mechanism for detecting controversy-related disagreement in Wikipedia.

Let W={D1, D2, D3 ... Dn} be the collection of articles in Wikipedia, and let p be the person (i.e., the editor) that instituted any change to a document (such as insertions, deletions, and substitutions).

Let ED={$e_1, e_2, \ldots e_k$} be the set of k edits applied to the document D. Let $\omega D=\{p \in \Omega | \exists \delta, (p, \delta) \in ED\}$ be the set of people who created the edits in ED (also called editors). Likewise, let $$\Omega_W = \bigcup_{D \in W} \omega_D$$

be the set of all editors in Wikipedia.

One approach might be to simply consider any revert to represent a conflicts relationship. Let conflicts (p1, p2)=reverts(p1, p2)$\vee$reverts(p2, p1), in which case we get:

$P(c|\Omega, D) = P(p1, p2$ selected randomly from $\Omega$ $\wedge(\text{reverts}(p1, p2) V \text{reverts}(p2, p1)))$ Unfortunately, this simple approach is likely to be too naive. We can conceptually distinguish between two types of reverts: those reverting vandalism and those reflecting opposing stances. To address this issue, Sumi et al., devised a reputation factor per editor, which grows proportionally with the number of edits the user contributes to this specific article.

The likelihood of an editor being a vandal is independent of all other editors. Adopting a probabilistic approach, we can reformulate the conflicts relationship, rather than being a binary value, into a probabilistic expression that captures the likelihood of a pair of editors reverting each other without vandalism. We can express this probability conditional on the existence of a mutual revert as $P(\text{conflicts}(p1,p2)|\text{reverts}(p1,p2) \wedge \text{reverts}(p2,p1))$ $=P(p1 \text{ is } not \text{ a vandal})*P(p2 \text{ is } not \text{ a vandal})$ In order to progress further, we need to estimate the probability that a specific person p is (or is not) a vandal. Here, indirectly following Sumi et al.'s reputation factor, we choose to use the number of edits a user has contributed to $E_D$, divided by the largest reputation factor for any editor on the page. To state this formally, let $E_{p,D} = \{e \in E_D | \exists \delta, e=(p,\delta) \in E_D\}$ be the set of edits contributed to document D by editor p. Let N D=Ep, D be the size of that set, i.e. the number of edits contributed to D by p. Let $$N^D_{max} = \max_{p \in \omega_D} N^D_p.$$

Now, we estimate the probability of p's non-vandalism as $$P(p \text{ is not vandal}) = \frac{N^D_p}{N^D_{max}+1}.$$

Note that this probability is independent for each editor and is in the range $$\left[\frac{1}{N^D_{max}+1}, \frac{N^D_{max}}{N^D_{max}+1}\right].$$

We can marginalize over all pairs of editors for the document and incorporate this probability into our contention estimate. Let MR_D={(pi, pj)| pi, pj ∈ωD s.t. i<j ∧ reverts (p1, p2) ∧ reverts (p2, p1)} be the set of pairs that have mutually reverted each other. We can then calculate contention as follows:

$$P(c | \Omega, D) = \frac{\sum_{p_1, p_2 \in \omega_D} P(\text{conflicts}(p_1, p_2))}{|\Omega|^2} = \frac{1}{|\Omega|^2} * \sum_{(p_i, p_j) \in MR_D} \frac{N_{p_i, D}}{N^D_{max}+1} * \frac{N_{p_j, D}}{N^D_{max}+1}$$

Note that we select the editors from $\omega_D$, yet we can measure contention over any superset of $\omega_D$, for example $\theta_W$. This allows us to compare contention across either local (article-specific) populations as well as larger ones, up to and including all of Wikipedia's editors.

4.3.2 Importance. We assume that an editor p who makes a change to the document is affected by the corresponding topic. Hence, we estimate ΩT to be the size of the editors who have been involved with any change of the document.

$$P(I | T, \Omega_{\text{\tiny{\textregistered}}}) = \frac{|\omega_D|}{|\Omega_{\text{\tiny{\textregistered}}}|}$$

4.3.3 Ranking Controversial Articles in Wikipedia. We compare the contention derived from our model ("C") and controversy ("CI") scores, which is a version of C score multiplied by importance "I", against the state-of-the-art heuristic "M" score. To verify the effectiveness of our new controversy score in predicting controversial Wikipedia articles, we rank all Wikipedia articles by four controversy-indicative scores: M, C, MI, and CI. To observe the effect of the importance score, we also devise an "MI" score, which is the M score weighted by its topic importance in Wikipedia. We used the truth data judgment for controversial Wikipedia articles from "the list of controversial issues" page in Wikipedia as well as a previously collected annotated dataset. Our judgment data contain 1,551 controversial articles. All articles that are not in the list are considered to be non-controversial. We then compute Area Under Curve (AUC) measure on the generated list.

TABLE 4

AUC measure reported on ranking controversial articles in Wikipedia by four scores.

|  | M | C | MI | CI |
|---|---|---|---|---|
| AUC | 0.649 | 0.649 | 0.630 | 0.660 |

Table 4 shows the AUC measure reported on ranking controversial articles by the four scores. While M and our C scores are comparable, CI score produced a better ranking than any of the measure. This result demonstrates that our model, when applied to Wikipedia, shows a competitive predictive power in classifying controversial articles in Wikipedia.

Example Digital Processing Environment

Figure 7:
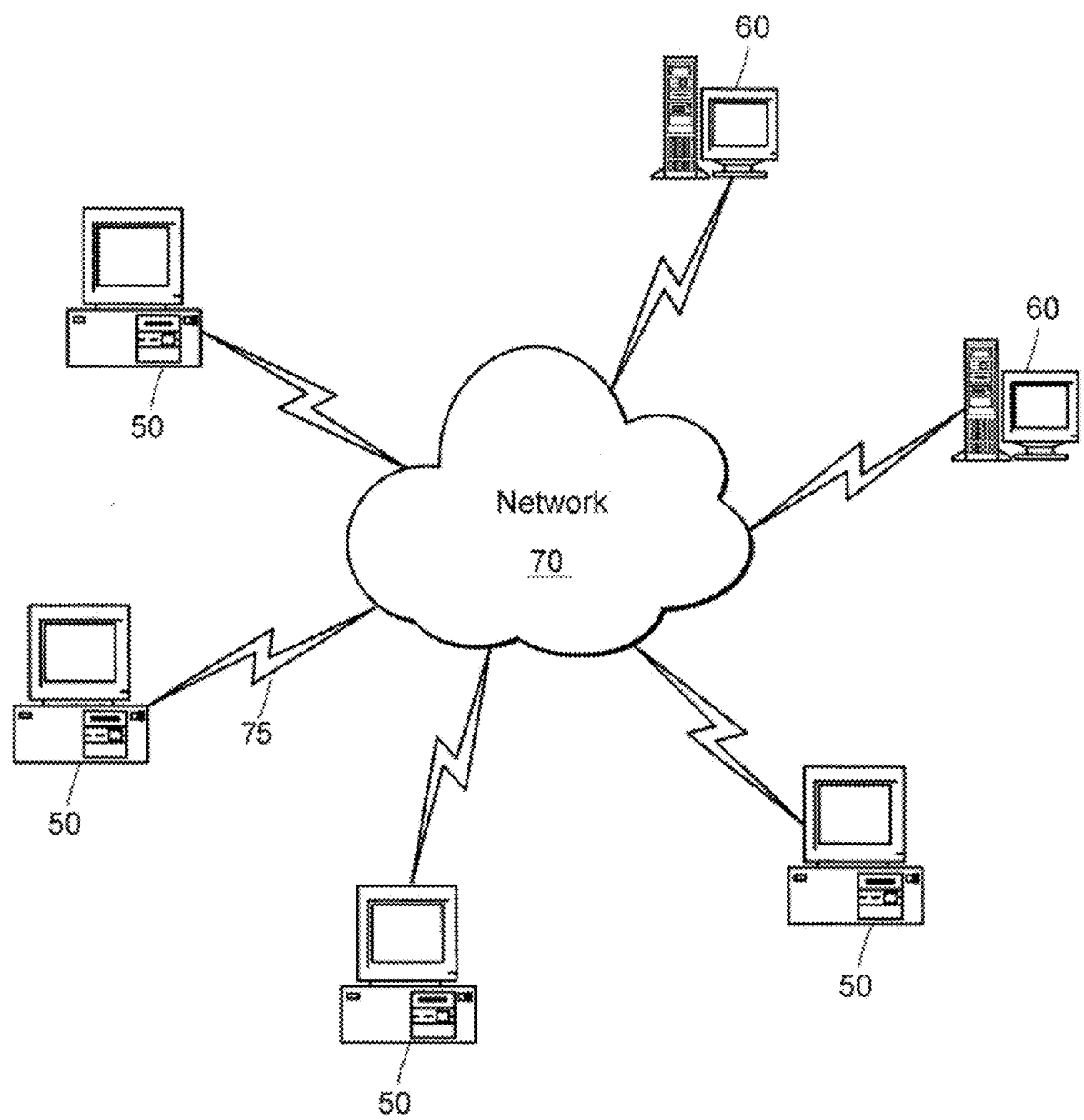
FIG. 7 is a schematic view of a computer network environment in which the example embodiments presented herein may be implemented.

FIG. 7 illustrates a computer network or similar digital processing environment in which the present embodiments may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable. In the context of such a network, a subscription-based service can be implemented on a server, for example, where the connected devices can provide to the service data used by the example systems and methods disclosed herein to model controversy.

Figure 8:
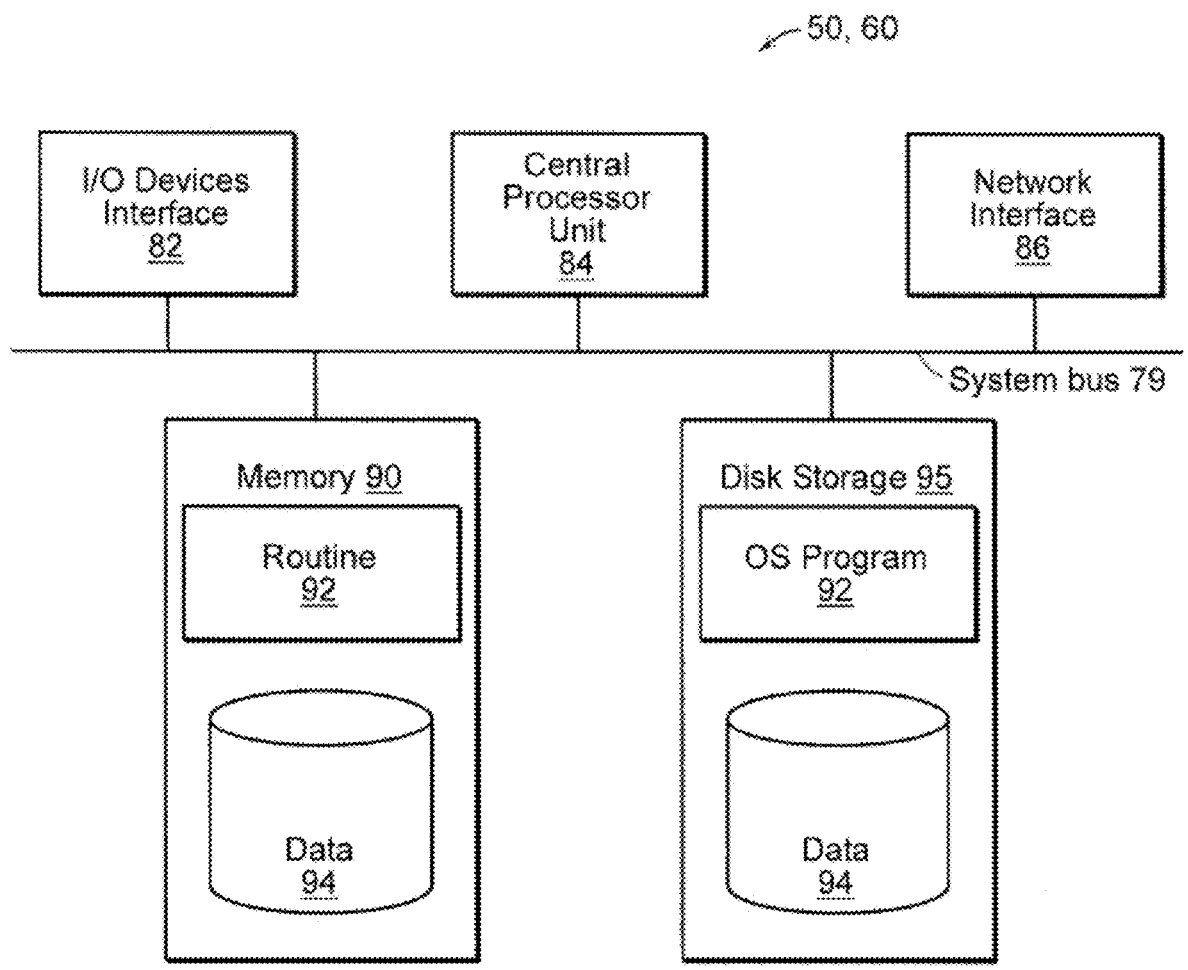
FIG. 8 is a block diagram illustrating an example computer node of the network of FIG. 7.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, and network ports) that enables the transfer of information between the elements. Attached to system bus 79 is I/O device interface 82 for connecting various input and output devices (e.g., keyboard, mouse, displays, printers, and speakers) to the computer 50, 60. Network interface 86 allows the computer to connect to various other devices attached to a network (e.g., network 70 of FIG. 7). Memory 90 provides volatile storage for computer software instructions 92 and data 94 used to implement many embodiments (e.g., the example method 200 of FIG. 2). Disk storage 95 provides non-volatile storage for computer software instructions 92 and data 94 used to implement many embodiments. Central processor unit 84 is also attached to system bus 79 and provides for the execution of computer instructions.

In the context of FIG. 8, the computer 50, 60 can include an interface 82, 86, memory 90, 95, and processor 84. The memory 90, 95 can store a representation of a topic, population, contention on the topic among individuals of the population, importance of the topic within the population, and model of controversy for the topic. The processor 84 can be configured to determine contention on a topic among individuals of the population, determine importance of the topic within the population, and create a model of controversy for the topic based on the contention on the topic and the importance of the topic. In addition, or in the alternative, the processor 84 can be configured to determine, and store in the memory 90, 95, representations of stances of individuals in the population with regard to a topic. The processor 84 can be further configured to, for pairs of stances, determine, and store in the memory 90, 95, a representation of a measure of conflict between a first stance and a second stance. The processor 84 can be further configured to determine, and store in the memory 90, 95, a representation of a probability that a first individual and a second individual hold conflicting stances on the topic.

In one embodiment, the processor routines 92 and data 94 are a computer program product (generally referenced 92), including a computer readable medium (e.g., a removable storage medium such as one or more DVD-ROM's, CD-ROM's, diskettes, and tapes) that provides at least a portion of the software instructions for the system. Computer program product 92 can be installed by any suitable software installation procedure, as is well known in the art. In another embodiment, at least a portion of the software instructions may also be downloaded over a cable, communication and/or wireless connection. In other embodiments, the program product 92 may be implemented as Software as a Service (SaaS), or other installation or communication supporting end-users.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for modeling controversy within a population, the system comprising:
    an interface configured to obtain information regarding stances of individuals in the population on a topic;
    memory; and
    a processor configured to:
        determine and store in the memory a representation of contention on the topic among individuals of the population, the representation of contention being determined based on (i) the stances of individuals in the population and (ii) a measure of exclusivity between the stances, wherein the representation of contention quantifies a proportion of individuals in the population, from amongst a total number of individuals in the population, in disagreement regarding the topic;
        determine and store in the memory a representation of importance of the topic within the population, the representation of importance indicating a number of individuals in the population affected by the topic; and
        create and store in the memory a model of controversy for the topic based on the representation of contention on the topic and the representation of importance of the topic.

2. A system as in claim 1 wherein the processor is further configured to predict whether the topic is controversial based on the model of controversy.

3. A system as in claim 1 wherein the processor is further configured to determine a controversy score for the topic based on the model of controversy.

4. A system as in claim 1 wherein the processor is further configured to determine contention on the topic by determining the proportion of individuals in the population, from amongst the total number of individuals in the population, that are in disagreement regarding the topic.

5. A system as in claim 1 wherein the processor is further configured to determine pairs of stances that are mutually exclusive stances.

6. A system as in claim 1 wherein the processor is further configured to determine contention on the topic by determining a probability that two given individuals have conflicting stances on the topic.

7. A system as in claim 1 wherein the processor is further configured to determine importance of the topic by determining a probability that the topic is important to a given individual in the population.

8. A method of modeling controversy within a population, the method comprising:
    determining contention on a topic among individuals of the population based on (i) stances of individuals in the population and (ii) a measure of exclusivity between the stances, the determined contention quantifying a proportion of individuals in the population, from amongst a total number of individuals in the population, in disagreement regarding the topic;
    determining importance of the topic within the population, the determined importance indicating a number of individuals in the population affected by the topic; and
    creating a model of controversy for the topic based on the contention on the topic and the importance of the topic.

9. A method as in claim 8 further comprising predicting whether the topic is controversial based on the model of controversy.

10. A method as in claim 8 further comprising determining a controversy score for the topic based on the model of controversy.

11. A method as in claim 8 wherein determining contention on the topic includes determining the proportion of individuals in the population, from amongst the total number of individuals in the population, that are in disagreement regarding the topic.

12. A method as in claim 8 wherein determining contention on the topic includes determining the stances that the individuals in the population have on the topic.

13. A method as in claim 12 wherein determining contention on the topic includes determining a probability that two given individuals have conflicting stances on the topic.

14. A method as in claim 8 wherein determining importance of the topic includes determining a probability that the topic is important to a given individual in the population.

15. A non-transitory machine-readable storage medium having stored thereon a computer program for modeling controversy within a population, the computer program comprising a routine of set instructions for causing the machine to:
   determine contention on a topic among individuals of the population based on (i) stances of individuals in the population and (ii) a measure of exclusivity between the stances, the determined contention quantifying a proportion of individuals in the population, from amongst a total number of individuals in the population, in disagreement regarding the topic;
   determine importance of the topic within the population, the determined importance indicating a number of individuals in the population affected by the topic; and
   create a model of controversy for the topic based on the contention on the topic and the importance of the topic.

16. A machine-readable storage medium as in claim 15 further comprising instructions for causing the machine to predict whether the topic is controversial based on the model of controversy.

17. A machine-readable storage medium as in claim 15 further comprising instructions for causing the machine to determine a controversy score for the topic based on the model of controversy.

18. A machine-readable storage medium as in claim 15 further comprising instructions for causing the machine to determine contention on the topic by determining the proportion of individuals in the population, from amongst the total number of individuals in the population, in disagreement regarding the topic.

19. A machine-readable storage medium as in claim 15 further comprising instructions for causing the machine to determine contention on the topic by determining the stances that the individuals in the population have on the topic.

20. A machine-readable storage medium as in claim 19 further comprising instructions for causing the machine to determine contention on the topic by determining a probability that two given individuals have conflicting stances on the topic.

* * * * *